Jan. 29, 1957 T. LO FARO 2,779,167
DEVICE FOR FREEZING ICE CREAM AND ICES
Filed Dec. 20, 1954 3 Sheets-Sheet 1
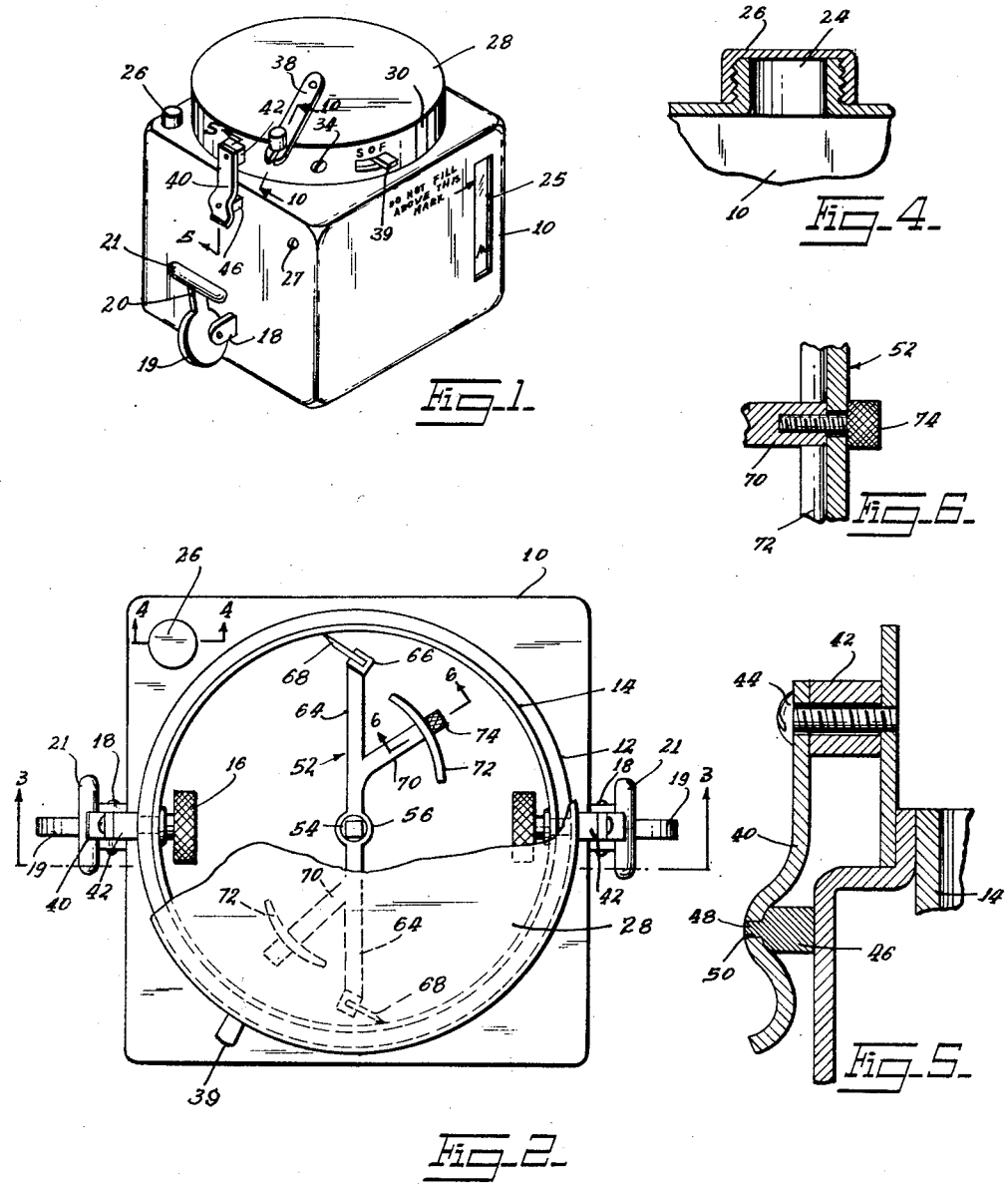
INVENTOR.
THOMAS LO FARO
BY
ATTORNEY

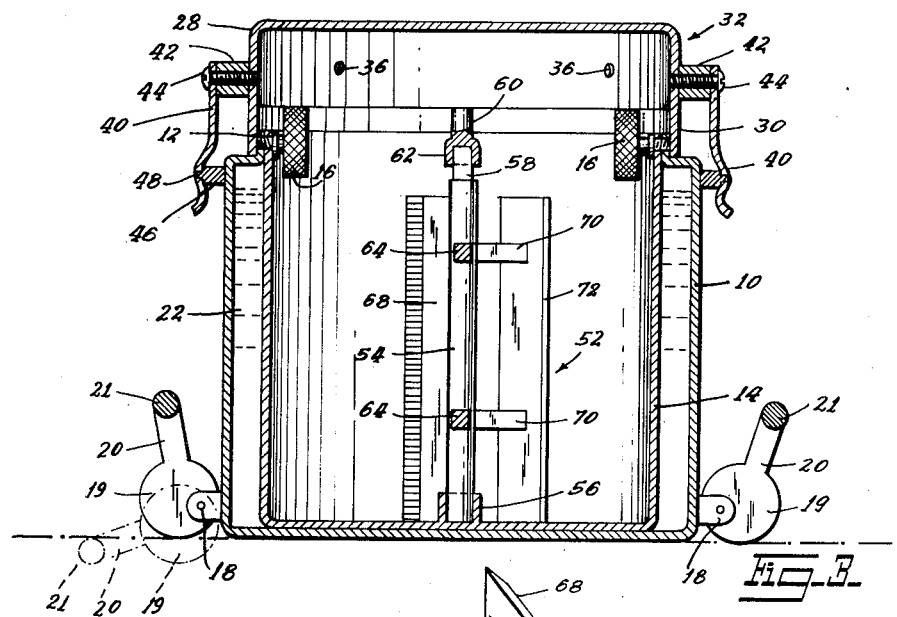
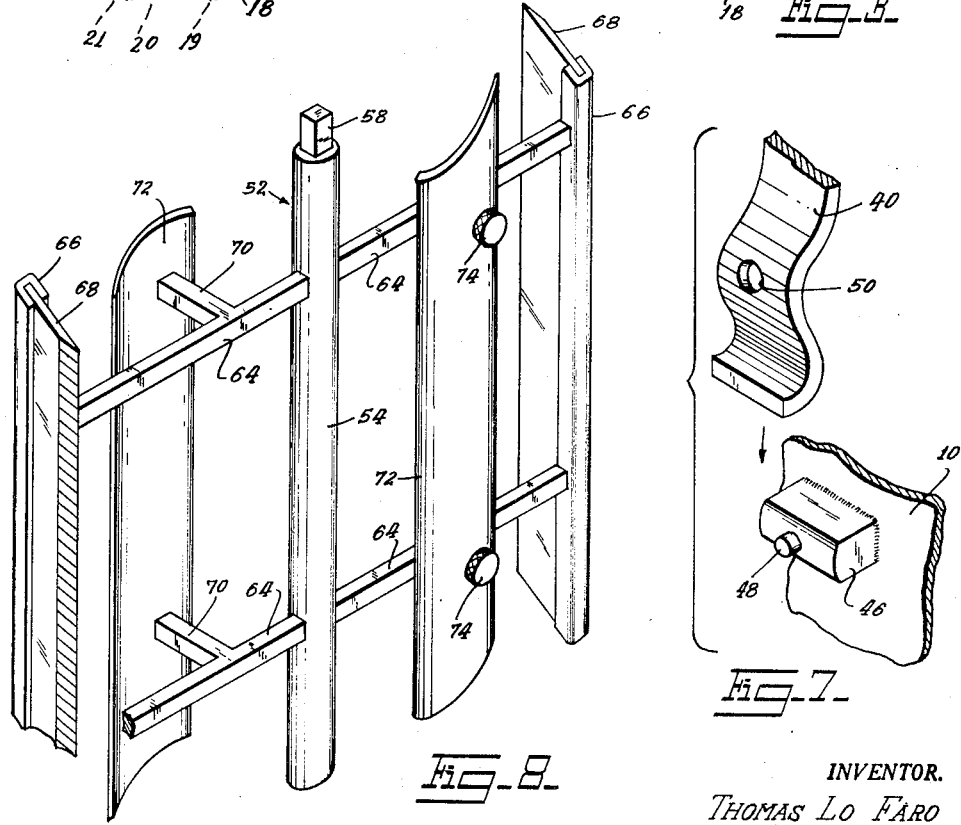

Jan. 29, 1957 T. LO FARO 2,779,167
DEVICE FOR FREEZING ICE CREAM AND ICES
Filed Dec. 20, 1954 3 Sheets-Sheet 3
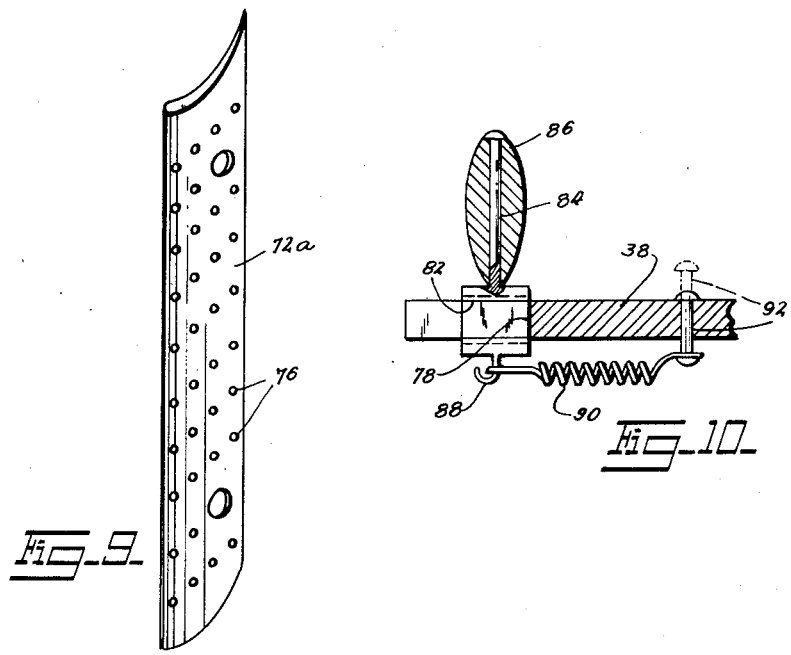
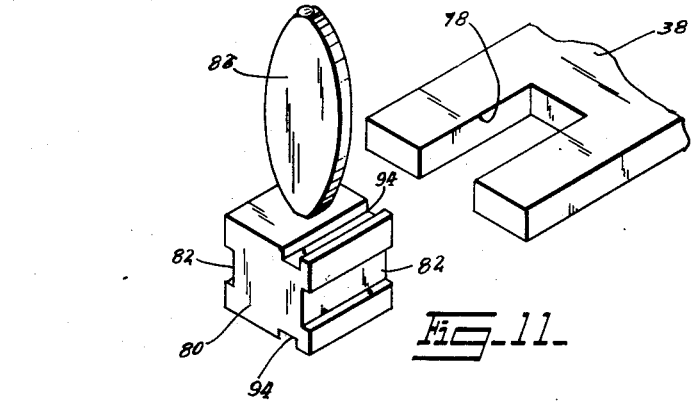
INVENTOR.
THOMAS LO FARO
BY
ATTORNEY

United States Patent Office 2,779,167
Patented Jan. 29, 1957

2,779,167

DEVICE FOR FREEZING ICE CREAM AND ICES

Thomas Lo Faro, Brooklyn, N. Y.

Application December 20, 1954, Serial No. 476,518

1 Claim. (Cl. 62—114)

This invention relates to a device for freezing ice cream and ices. More particularly, the invention has reference to a small, compact device of the nature referred to, that can be inserted in the conventional freezing compartment of an ordinary home refrigerator.

One important object of the present invention is to provide a device of the type stated which, despite its small size, will nevertheless make a substantial quantity of ice cream, sherbet, or the like, due to the provision of a spring wound motor constituting a part of the device, which motor rotates a blade and agitator assembly within the container in which the mix is disposed.

Another object of importance is to provide a device of the type referred to in which the combined blade and agitator assembly is so designed as to permit the blades to be used without the agitators, or vice versa.

Another object of importance is to provide a device of the nature referred to in which the blades and agitators are independently removable, for substitution of different blades, or agitators of other shapes.

Still another object of importance is to provide a device of the nature stated in which the motor will be hermetically sealed, somewhat in the manner of a waterproof watch, thus to avoid deterioration of the mechanism of the motor by dampness within the freezing compartment of the refrigerator.

Yet another object is to embody the motor in a cover of the freezing device, the removal of said cover being adapted to automatically uncouple the motor shaft from the shaft of the combination blade and agitator asesmbly, the agitator and blade assembly by this action being exposed for removal from the container in which said assembly is rotatable.

Another object of importance is to permit the container in which the mix is deposited to be readily removable from an outer jacket or casing, thereby to permit said container to be returned to the freezing compartment separately from the outer casing and motor, after the ice cream has been made, so that it may be kept in a frozen condition within the refrigerator.

Yet another object of importance is to incorporate in the motor device means for adjusting the speed of the motor, whereby to cause the blade and agitator assembly to be rotated at different, selected speeds, according to whether the device is being used for making ice cream or ices.

Still another object of importance is to incorporate in the cover a clamp assembly that will engage the outer casing when the motor is in operation, said clamp assembly being so designed as to releasably engage the cover with the outer casing of the device, in such a way as to prevent the transmission of torque to the cover and motor tending to rotate the same.

Another object is to provide a novel handle means on the outer casing, which not only will be adapted for facilitating the lifting and moving of the device, but also will be adapted, when rocked in one direction, to break the device away from the adjacent bottom wall of the freezing compartment of a refrigerator, should the device be frozen fast to said bottom wall.

A further object of importance is to so design the outer casing as to permit a quantity of water to be deposited therein, to further chill the wall of the inner container during the making of the ice cream or ice.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a home freezer formed in accordance with the present invention.

Fig. 2 is an enlarged top plan view in which the motor and cover have been partially broken away.

Fig. 3 is a longitudinal sectional view on line 3—3 of Fig. 2.

Fig. 4 is a vertical sectional view taken on line 4—4 of Fig. 2.

Fig. 5 is a greatly enlarged detail sectional view of the clamp assembly taken on line 5—5 of Fig. 1.

Fig. 6 is an enlarged, fragmentary detail sectional view of the means for attaching the agitator blades, taken substantially on line 6—6 of Fig. 2.

Fig. 7 is an enlarged, fragmentary exploded perspective view of the clamp assembly.

Fig. 8 is an enlarged, fragmentary perspective view of the combination scraping blade and agitator assembly, per se.

Fig. 9 is a perspective view of a modified form of agitator blade, per se.

Fig. 10 is an enlarged, detail sectional view substantially on line 10—10 of Fig. 1.

Fig. 11 is an exploded, enlarged perspective view of the winding crank.

The reference numeral 10 has been applied in the several figures of the drawing to a rectangular outer receptacle or casing, having a top wall formed with a large center opening, bounded by an upstanding, low neck 12.

A cylindrical inner container 14, as shown in Fig. 3, fits snugly in the opening of the outer container, and is wholly open at its top, the top edge of the inner container 14 registering with the top edge of the neck 12 and being in contact with said neck 12. At diametrically opposite locations upon the inner surface of the inner container 14, at the upper end of the inner container, there are provided bolts 16, the shanks of which are extended through smooth-walled openings formed in the upper end of the inner container, and threaded in complementarily threaded openings formed in the neck 12. The bolts, at the inner ends of their shanks, are formed with circumferential collars that abut against the inner surface of the inner container, said collars being spaced closely from knurled heads provided upon the bolts. The bolts constitute handles which can be used for lifting the inner container out of the outer container, after the bolts have been backed out of the threaded openings of the outer container, thus facilitating cleaning of the device.

At the lower end of the outer container, on opposite walls thereof (Figs. 1 and 2) pairs of outwardly projecting perforated ears 18 are formed, and extended between the ears of each pair is a pivot pin, passing through an opening formed in the marginal portion of a circular disc 19. Disc 19 is integral with an arm 20 extending upwardly therefrom, the arm 20 being rigid with the intermediate portion of a handle 21.

Since the discs 19 of the handles are pivotally connected to the ears eccentrically, the handles can be swung from the full to the dotted line positions of Fig. 3, in such a way as to cause the marginal portions of the discs 19 to exert a downward pressure against an adjacent bottom wall of a freezing compartment, not shown, in which the device is disposed. As a result, should the device be frozen fast to said bottom wall of the freezing compartment, the downward rocking of the handles to their dotted line positions will cause the outer casing to be broken away from the freezing compartment surface.

The inner and outer containers, when the inner container has been inserted, cooperate to define a water space 22 fully surrounding the inner container, in which space a quantity of water W can be placed. In this way, the inner container is immersed in water, to accelerate the freezing action of the mix that would be placed in the inner container during the making of ice cream, or sherbet or other type of flavored ice. A filler neck 24 (Fig. 4) may be formed upon one corner portion of the top wall of the outer casing, and is externally threaded for application of a complementarily threaded cap 26 thereto. The water can be poured into the jacket defined by the containers through said filler neck, and can also be removed through the neck if desired.

In one of the side walls of the outer container there is formed an opening 25 which is sealably covered by transparent glass or plastic, thus providing a view window. An index marking is disposed adjacent the window, at a selected level, and adjacent said marking, which is in the form of an arrow or the like, there is disposed the legend "Do not fill above this mark." In this way, when the jacket is filled, the user can view the level of the water as it rises within the jacket, and can stop pouring water into the jacket when the level reaches the index.

Adjacent the upper end of the water jacket, an aperture 27 is formed, to provide an outlet for excess water.

A flat, circular cover 28, having a diameter corresponding substantially to that of the opening of the outer container 10, has a depending peripheral flange 30 adapted to fit snugly over the upstanding neck 12. A motor generally designated 32, of the spring wound type, is provided as a separate unit sealed in its own casing hermetically, to prevent dampness from affecting adversely the mechanism thereof. The motor 32 is mounted upon the underside of cover 28, through the provision of screws 34, extending through circumferentially and uniformly spaced openings formed in the flange of the cover into threaded openings formed in the motor casing.

The motor is wound by a hand crank 38, which is supported upon the cover 28.

The crank 38 has an adjustable knob on its outer end, which knob will be described in detail hereinafter.

The motor is of the two speed type and, accordingly, formed in the motor casing and in the flange 30 are registering slots, through which a button 39 projects. The button is movable between the opposite ends of the slot, the flange 30 being marked "S" and "F" to designate the slower and faster speeds, respectively, of the motor. Ordinarily, when ice cream is being made, the button would be shifted to position to cause high speed operation of the motor, since under these circumstances, it is not desired that any of the mix freeze upon the wall of the inner container. Further, when making ice cream, substantial agitation of the mix is desired. When, however, a type of frozen, flavored ice is being made, the motor would be operating at a slower speed, since under these circumstances, the mix is not to be agitated as much, and further, is permitted to collect to a greater degree upon the wall of the inner container.

The cover 28 and the motor are removable as a unit from the position shown in Figs. 1 and 2, but ordinarily, when the motor is in operation, the cover is clamped to the outer receptacle by diametrically opposite spring clamps 40 having outwardly crimped lower end portions.

At their upper ends, the spring clamps have openings registering with similar openings formed in spacer blocks 42, screws 44 extending through the openings of the clamps and blocks and being threaded into registering openings formed in the flange 30 of the cover. Below the blocks 42, lugs 46 are welded or otherwise permanently affixed to the side wall of the outer receptacle (see Fig. 7) and are formed with upwardly projecting, small detent pins or projections 48. The outwardly crimped portions of the spring clamps engage over the lugs 46, and in this position of the parts, openings 50 formed in the spring clamps receive the pins 48. As a result, not only is the cover held down in proper position upon the outer receptacle, but also, the cover is held against rotatable movement. Such rotatable movement might otherwise tend to occur, should the resistance offered by the mix to passage of the blade and agitator assembly therethrough be so great as to impart a reverse torque to the motor and cover.

The combination scraping blade and agitator assembly has been generally designated 52 and includes an elongated, cylindrical shaft 54, the lower end of which is removably journalled in an upwardly opening bearing cup 56 integrally formed upon the center portion of the lower end wall of the inner container. At its upper end, the shaft 54 has a non-circular axial extension 58, aligned coaxially with the depending shaft 60 of the motor. Formed upon the lower end of motor shaft 60 is a downwardly opening non-circular socket 62 in which the extension 58 engages in the applied position of the cover.

In this way, whenever the cover is applied and the motor is in operation, the assembly 52 will be rotated at a selected speed within the container. However, when the cover is removed, the assembly 52 can also be readily removed, so as to be taken out of the inner container, thus leaving the inner container capable of functioning as a receptacle for the ice cream or ice, by removal of the inner container from the outer receptacle 10.

Integrally or otherwise formed upon the shaft 54, at locations spaced longitudinally thereof, are radially projecting arms 64. A pair of arms is disposed adjacent the upper end of the shaft 54, and a second pair is adjacent the lower end, the arms of each pair extending horizontally from the shaft and being aligned diametrically of the inner container. On the outer ends of the arms at each side of the shaft 54, there are provided channeled blade holders 66, rigidly connected to the arms and extending in parallelism with the shaft 54. The blade holders 66 have side walls disposed obliquely to the lengths of the arms 64, and frictionally engaged in the blade holders are wide blades 68 having sharpened outer edges. Blades 68, due to the oblique disposition of the side walls of the blade holders, are disposed in planes oblique to the lengths of the arms 64, thus to position the blades 68 for wiping movement over the inner surface of the inner container. The blades 68 thus continuously scrape from the wall of the inner container accumulations of frozen mix that would tend to collect thereon during the freezing operation.

The blades are removable from the blade holders and, accordingly, if the particular product being made in the device is not to be scraped from the wall of the inner container, but rather, is to collect upon said wall, the blades can be removed. Integrally formed upon the intermediate portions of the arms 64 are branches 70, disposed obliquely to the lengths of the arms, and carried by the branches 70 are agitators 72 extending in parallelism with the shaft 54. The agitators are transversely curved and are disposed obliquely to the path of movement of the agitators during rotation of the assembly 52. Each of the agitator blades 72 have longitudinally spaced, smooth-walled openings receiving thumb screws 74, threadable in threaded sockets formed in the outer ends of the branches 70 (Fig. 6).

By reason of this arrangement, the agitator blades 72 can be removed if desired, for substitution of new blades having a different pitch or shape. Further, the arrangement permits the agitator blades to be used without the scraper blades 68. Alternatively, the arrangement permits the blades 68 to be used without the agitators or in combination with the agitators in the manner shown in Fig. 2. In making ice cream, for example, both types of blades will be used together, and the motor would be operated at a relatively high speed, thus to agitate the mix thoroughly, while preventing said mix from collecting upon the wall of the inner container.

As shown in Fig. 9, the individual agitator blades can be freely perforated, and thus, a modified, removable blade 72ª would in this event be formed with perforations 76. The blades 72ª would be substituted for the blades 72, or vice versa and in any event, the agitator blades may in some instances be formed with perforations and in other instances be left imperforate.

Referring to Figs. 10 and 11, there is here shown the particular construction of the winding crank 38. The crank 38 includes an elongated bar which is pivotally connected at its inner end upon the cover, it being understood that the inner end of the bar would be secured to a shaft for rotating the same to wind the motor.

At its outer end, the elongated bar or body portion of the crank is formed with a longitudinal slot 78 opening upon the outer end of the crank, and adapted to receive the removable, rectangular block 80. The block 80, at opposite sides thereof, has outwardly facing grooves 82, said grooves being adapted to receive the opposite side walls of the slot 78.

A stud 84 is integrally formed upon the upper surface of the block, and rotatably carried by said stud is a flattened, elliptical handle or knob member 86.

Depending from the underside of the block is a hook 88, to which is detachably connected one end of a coil spring 90, the other end of which is hooked to a pin 92 carried by the bar of the crank 38.

The pin 92 is greater in length than the thickness of the bar, and thus can be shifted between the full and dotted line positions shown in Fig. 10. As a result, by unhooking the spring from the pin, the block can be reversed side for side, so as to cause the knob element 86 to extend downwardly instead of upwardly as in Fig. 10. The pin 92 can now be shifted to the bottom line position in Fig. 10, and the spring 90 can be hooked once again at its opposite ends to the pin 92 and hook 88. The hook 88 and pin 92 will now receive the spring above the top surface of the bar. This disposes a knob element in inoperative position, where it will not be in the way.

If desired, the knob element 86 can be projected laterally instead of upwardly or downwardly. In this event, the block 80 is turned 90° from the position thereof shown in Figs. 10 and 11, and this registers a pair of grooves 94, formed in the top and bottom surfaces of the block adjacent one side wall of the block, with the side walls of the slot 78 so as to receive said side walls of the slot. When the block 80 is disposed in this position, the knob element 86 will project laterally, either above or below the plane of the body portion of the crank, whichever is desired.

The spring 90 can expand, when the knob element 86 is projected laterally, to an extent sufficient to extend to one side of the crank. Thus, in all positions of the knob element, the spring acts to urge the block against the inner end of the slot 78, to prevent separation of the knob and body of the crank 58. The spring still, however, permits adjustment of the knob to any of the positions mentioned, whenever desired.

The device would be so proportioned as to permit it to be readily inserted in a conventional freezer of an electrical refrigerator having a cooling unit such as is used in the home. In this way, it is possible to have a portable freezer, that operates in the same manner as a full size ice cream freezer, with said portable freezer being adapted to make a rather substantial quantity, as for example two or three quarts of ice cream, merely by insertion of proper mix in liquid form in the inner container, and by winding of the motor to the necessary extent.

While the inner details of the motor are not shown, it would be understood that said motor would be so designed as to permit the same to operate, after a single winding, for the necessary length of time to complete the making of the ice cream or frozen, flavored ice or sherbet. The inner construction of such motors is well known in the art of manufacturing spring wound motors, and accordingly, it is not believed necessary to illustrate the same herein.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

A portable freezer for ice cream and ices for use with an electrical refrigeration apparatus comprising an outer container adapted to be inserted into said apparatus, an inner container removably seated in said outer container, a scraper blade and agitator assembly removably and rotatably mounted in the inner container, a removable cover for the containers, a motor on the cover having a driving connection to said assembly, and means releasably clamping the cover to the outer container, the outer container including a top wall having a center opening and an upstanding neck bounding said center opening, the cover including a depending peripheral flange engaging snugly against and surrounding said neck, said motor being mounted upon the underside of said container, and being hermetically sealed, the motor including a crank for winding the same, said crank being rotatably mounted upon the cover and including at its outer end a knob adjustable to selected positions relative to the length of the crank in one of which positions the knob extends upwardly, said knob in a second position extending downwardly and in a third position extending laterally of the crank.

References Cited in the file of this patent

UNITED STATES PATENTS

| Number | Name | Date |
| --- | --- | --- |
| 325,877 | Taylor | Sept. 8, 1885 |
| 1,873,191 | Fabrey | Aug. 23, 1932 |
| 1,885,139 | Porter | Nov. 1, 1932 |
| 1,916,746 | Swisher | July 4, 1933 |
| 1,952,985 | Hopkes | Mar. 27, 1934 |
| 1,956,621 | Parker | May 1, 1934 |
| 1,978,176 | Steenstrup | Oct. 23, 1934 |
| 2,181,089 | Kettleborough | Nov. 21, 1939 |
| 2,191,344 | Erickson | Feb. 20, 1940 |
| 2,204,382 | Romanski | June 11, 1940 |
| 2,290,836 | McFerran | July 21, 1942 |
| 2,444,789 | Reeves | July 6, 1948 |
| 2,491,952 | Calmes | Dec. 20, 1949 |
| 2,514,787 | Nierste | July 11, 1950 |
| 2,577,916 | Rollman | Dec. 11, 1951 |
| 2,596,876 | Taecker | May 13, 1952 |
| 2,599,021 | Sebastian | June 3, 1952 |
| 2,719,031 | Morgan | Sept. 27, 1955 |

FOREIGN PATENTS

| Number | Country | Date |
| --- | --- | --- |
| 850,176 | France | Dec. 9, 1939 |